July 21, 1925. 1,547,041
C. L. ISREAL
ATTACHMENT FOR POWER SHOVELS OR DREDGES
Filed Dec. 27, 1924
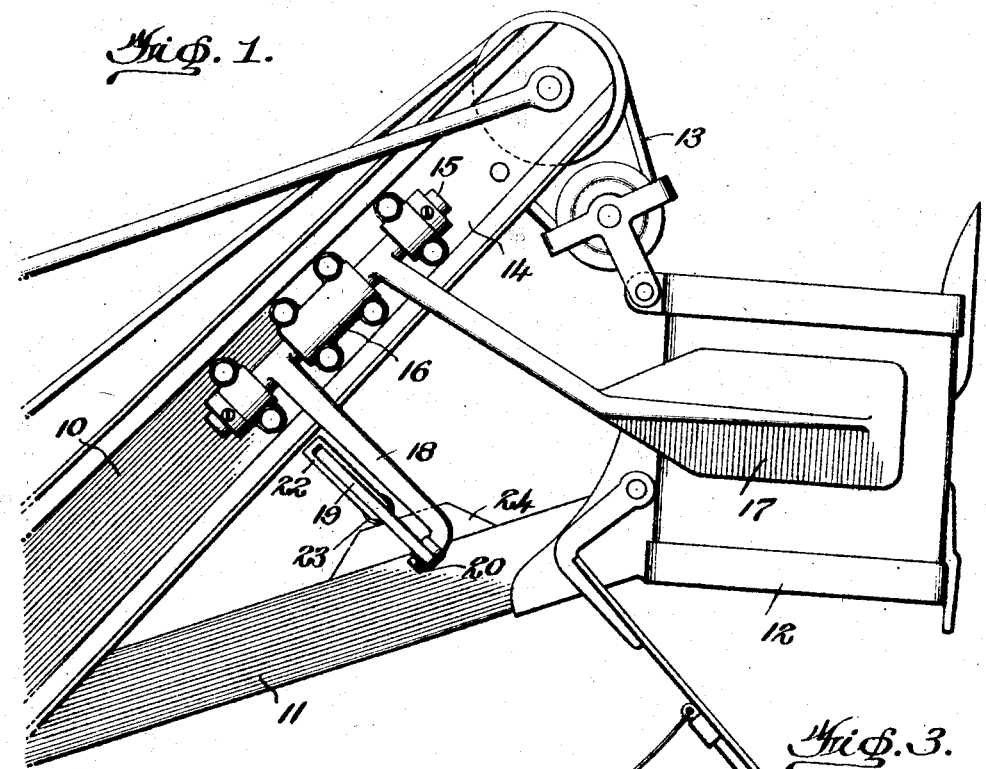
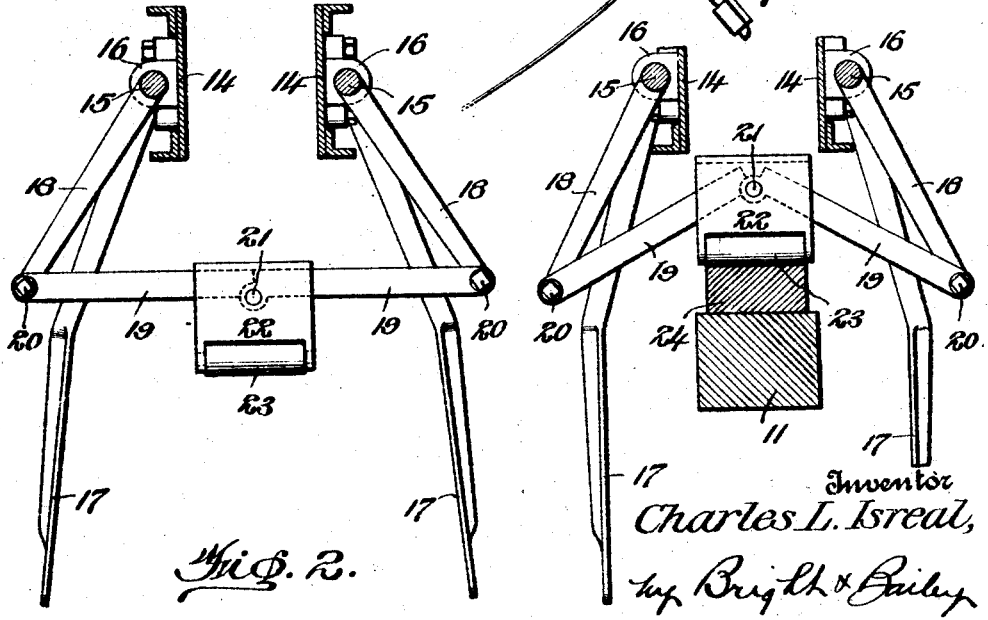
Inventor
Charles L. Isreal,
by Bright & Bailey
Attorneys Patented July 21, 1925.

1,547,041

UNITED STATES PATENT OFFICE.

CHARLES L. ISREAL, OF PORTLAND, OREGON, ASSIGNOR OF ONE-HALF TO PETER ODEGARD, OF PORTLAND, OREGON.

ATTACHMENT FOR POWER SHOVELS OR DREDGES.

Application filed December 27, 1924. Serial No. 758,400.

*To all whom it may concern:*

Be it known that I, CHARLES L. ISREAL, a citizen of the United States, and resident of Portland, in the county of Multnomah and State of Oregon, have invented certain new and useful Improvements in Attachments for Power Shovels or Dredges, of which the following is a specification.

As is well known it is a common practice to shake the bucket of a power shovel or dredge by means of the shovel or dredge operating mechanism in order to loosen from the bucket such material as may adhere thereto after the bucket has been dumped. This practice, however, not only is inefficient, but very harmful to the operating mechanism, and therefore it is my object to provide a simple, positive and efficient means of accomplishing the same purpose automatically and without in any way subjecting the operating mechanism to injurious stresses and strains.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views:

Fig. 1 is a side elevation of a portion of a power shovel or dredge showing the mechanism of my invention operatively associated therewith;

Figure 2, a transverse section showing a normal position of the parts comprising my invention; and Figure 3, a view similar to Figure 2 showing the parts of my mechanism moved to a position to loosen material from the bucket of the shovel or dredge.

In the drawings I have illustrated only such portions of a power shovel or dredge as are essential to a disclosure of my invention, namely, a boom 10 and a beam 11, the latter carrying a shovel or bucket 12 and being movable towards and away from the boom for purposes of raising and lowering the shovel or bucket through the instrumentality of conventional cable and pulley mechanism shown at 13.

In the present instance boom 10 is shown as being made up of spaced side plates 14, 14, between which the shovel beam 11 operates, and carried upon the outer face of each side plate is a shaft 15 rotatably mounted in bearing blocks 16.

A beater 17 is formed either as an integral part of each shaft 15 or is affixed thereto in any suitable manner so as to swing when said shafts are rotated, and said beaters extend in such relation to the respective shafts 15 as to be disposed one to either side of the shovel or bucket 12 when the latter is in an elevated position.

An arm 18 also extends from each shaft 15 and said arms are connected together by a pair of links 19, 19, pivoted at their outer ends, respectively, to the free ends of said arms as at 20, 20, and pivoted together at their inner ends by a pin or bolt 21 that also connects them with a member 22 carrying a roller 23, so that when said member 22 is moved in the direction of the boom 10 the toggle joint constituted by the links 19, 19 is broken and the arms 18, 18 are swung towards one another thus swinging the beaters 17, 17 into striking engagement with the sides of the shovel or bucket 12 with the result that any material which may adhere to the interior of the latter after it is dumped will be loosened therefrom.

In order to render the beaters 17, 17 automatic in their operation so that they will strike the shovel or bucket when the latter reaches a predetermined elevated position, the beam 11 is provided on its upper face with a block 24 positioned to engage the roller 23 and impart to the member 23 movement to break the toggle joint constituted by the links 19, 19 as aforesaid, such breaking of the toggle joint occurring as the beam reaches a predetermined position in its upward movement towards the boom as is apparent.

From the foregoing description considered in connection with the accompanying drawings it is believed that the construction, operation and advantages of my device will be clearly understood. It is desired to point out, however, that various changes and desirable additions may be made in and to the structural arrangement shown within the spirit and scope of my invention as defined in the appended claims.

I claim:

1. In a power shovel or dredge, a boom, a beam movable towards and away from the boom, a shovel carried by said beam, and means operated by movement of the boom and beam towards one another to strike the shovel thereby to loosen material therein.

2. In a power shovel or dredge, a boom, a beam movable towards and away from the boom, a shovel carried by said beam, and means carried by the boom operated by the beam as the latter approaches the boom to strike the shovel thereby to loosen material therein.

3. In a power shovel or dredge, a boom, a beam movable towards and away from the boom, a shovel carried by said beam, and means operated by movement of the boom and beam towards one another to loosen material from the shovel.

4. In a power shovel or dredge, a boom, a beam movable with respect to said boom, a shovel carried by said beam, and means operated by predetermined relative movement of the boom and beam to loosen material from the shovel.

5. In a power shovel or dredge, a boom, a beam, a shovel carried by said beam, beaters carried by said boom adapted to strike said shovel to loosen material from the same, and means for operating said beaters.

6. In a power shovel or dredge, a boom, a beam, a shovel carried by said beam, beaters carried by said boom adapted to strike said shovel to loosen material from the same, and means actuated by said beam for operating said beaters.

7. In a power shovel or dredge, a boom, a beam, a shovel carried by said beam, beaters pivoted to said boom adapted to be swung to strike said shovel to loosen material from the same, and means operated by the beam to swing said beaters.

8. In a power shovel or dredge, a movable beam, a shovel carried by said beam, beaters adapted to strike said shovel to loosen material therefrom, means including a toggle joint operable when broken to cause said beaters to strike the shovel, and means whereby said toggle joint is broken by said beam.

9. In a power shovel or dredge, a boom, a beam movable towards and away from said boom, a shovel carried by said beam, a shaft carried by said boom, a beater carried by said shaft adapted to strike said shovel to loosen material therefrom, and means operated by movement of the beam towards said boom to rotate said shaft thereby to cause said beater to strike the shovel.

10. In a power shovel or dredge, a boom, a beam, a shovel carried by said beam, a shaft carried by said boom, a beater carried by said shaft adapted to strike said shovel to loosen material therefrom, an arm extending from said shaft, a means operating through said arm to rotate said shaft thereby to cause said beater to strike the shovel.

11. In a power shovel or dredge, a boom, a beam movable towards and away from said boom, a shovel carried by said beam, a pair of shafts rotatably mounted on opposite sides of said boom, respectively, a beater carried by each shaft adapted to be moved simultaneously into striking engagement with opposite sides of said shovel to loosen material therefrom, an arm extending from each shaft, a link pivoted to each of said arms, and a pivotal connection between said links, said pivotal connection being located in the path of movement of said beam whereby the latter operates said links to swing said arms thus to rotate said shafts and cause the beaters to strike said shovel.

12. In a power shovel or dredge, a boom, a beam movable towards and away from the boom, a shovel carried by said beam, and means operating automatically to loosen material from the shovel when the beam reaches a predetermined position with respect to the boom during its movement towards the boom.

In testimony whereof I hereunto affix my signature.

CHARLES L. ISREAL.